(12) United States Patent
Wiinikka et al.

(10) Patent No.: US 11,235,870 B2
(45) Date of Patent: Feb. 1, 2022

(54) DROOP RING WITH REMOVABLE WEAR ELEMENTS

(71) Applicant: Textron Innovations Inc., Providence, RI (US)

(72) Inventors: Mark Adam Wiinikka, Hurst, TX (US); Matthew Curtis Ledbetter, North Richland Hills, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 513 days.

(21) Appl. No.: 16/022,375

(22) Filed: Jun. 28, 2018

(65) Prior Publication Data

US 2020/0001991 A1 Jan. 2, 2020

(51) Int. Cl.
*B64C 27/32* (2006.01)

(52) U.S. Cl.
CPC ........ *B64C 27/322* (2013.01); *B23P 2700/01* (2013.01)

(58) Field of Classification Search
CPC ....... B64C 27/322; B64C 27/32; B64C 11/00; B64C 27/325; B64C 27/327
USPC .............................................. 416/134 A, 131
See application file for complete search history.

(56) References Cited

U.S. PATENT DOCUMENTS

| | | | |
|---|---|---|---|
| 4,613,021 A * | 9/1986 | Lacombe | F16D 65/122 188/218 XL |
| 4,907,677 A * | 3/1990 | Yamashita | F16D 65/092 188/218 XL |
| 5,007,799 A * | 4/1991 | Mouille | B64C 27/322 416/104 |
| 5,407,325 A | 4/1995 | Aubry | |
| 6,935,470 B1 * | 8/2005 | Smith, Jr. | F16D 65/12 188/218 XL |
| 2017/0210465 A1 | 7/2017 | Eberhard et al. | |

FOREIGN PATENT DOCUMENTS

| | | |
|---|---|---|
| EP | 0600797 A1 | 6/1994 |
| GB | 2028749 A | 3/1980 |
| JP | 3227584 B2 | 11/2001 |

OTHER PUBLICATIONS

TOEFCO Engineered Coating Systems, INC., Feb. 26, 2015, https://web.archive.org/web/20150512202833/https://toefco.com/what-are-metal-coatings/ (Year: 2015).*

* cited by examiner

*Primary Examiner* — David E Sosnowski
*Assistant Examiner* — Hakeem M Abdellaoui
(74) *Attorney, Agent, or Firm* — Slater Matsil, LLP

(57) ABSTRACT

A rotorcraft having a rotor system including a yoke, a plurality of grip assemblies, each of which is hingedly attach a rotor blade to the yoke, a plurality of flap stops, each flap stop attached to a respective grip assembly, a channel bounded by an upper and lower retaining surfaces, and a droop ring slideably disposed in the channel of the droop limiting system. The droop ring has a body with an inner surface, an outer surface, and a first end surface between the inner surface and the outer surface. The droop ring further has a first wear element removably disposed at the first end surface and extending above the first end surface and spaces the first end surface apart from the channel. Each flap stop is arranged to contact the outer surface of the droop ring and limit a downward droop of the respective rotor blade.

15 Claims, 6 Drawing Sheets

DROOP RING WITH REMOVABLE WEAR ELEMENTS

TECHNICAL FIELD

The present disclosure generally relates to a rotorcraft rotor assembly apparatus, and more specifically to a structural system and method for limiting rotor blade vertical droop.

BACKGROUND

In a rotorcraft, at high revolutions per minute (RPMs), rotor blades are subjected to large centrifugal force acting radially along the blade axis, which, when combined with the lift crated by the blades, increase root-to-tip angle the rotor blade. However, at lower RPMs, or when the rotor is stopped, the rotor blades will sag under the influence of gravity. A droop limiting system may be used to limit the droop of the rotor blades at low speeds without compromising performance of the rotor during flight.

SUMMARY

An embodiment rotorcraft has a rotor system and includes a yoke, a plurality of grip assemblies, each grip assembly of the plurality of grip assemblies hingedly attaching a respective rotor blade of a plurality of rotor blades to the yoke, a plurality of flap stops, each flap stop of the plurality of flap stops attached to a respective grip assembly of the plurality of grip assemblies, a droop limiting system having a channel bounded by an upper retaining surface, a lower retaining surface and a stop surface disposed between the upper retaining surface and the lower retaining surface, and a droop ring slideably disposed in the channel of the droop limiting system, the droop ring having a body with an inner surface, an outer surface, and a first end surface disposed between the inner surface and the outer surface, the droop ring further having a first wear element disposed at the first end surface, wherein the first wear element is removable, and wherein the first wear element extends above the first end surface and spaces the first end surface apart from the channel. Each flap stop of the plurality of flap stops is arranged to contact the outer surface of the droop ring and limit a downward droop of the respective rotor blade.

An embodiment droop ring includes a body having an inner surface, an outer surface, a first end surface disposed between the inner surface and the outer surface, and a second end surface disposed between the inner surface and the outer surface opposite the first end surface, where the first end surface has first cavities and the second surface has second cavities. The droop ring further includes a plurality of wear elements comprising first wear elements removably disposed in the first cavities and second wear elements removably disposed in the second cavities, where each of the first wear elements extends from within a respective one of the first cavities past the first end surface and has a first wear surface disposed above the first end surface, and where each of the second wear elements extends from within a respective one of the second cavities past the second end surface and has a second wear surface disposed above the second end surface.

An embodiment method of forming a rotorcraft droop ring, includes forming a body having ring shape with an inner surface, an outer surface, a first end surface disposed between the inner surface and the outer surface, and a second end surface disposed between the inner surface and the outer surface opposite the first end surface, where the first end surface has first cavities and the second surface has second cavities, providing a plurality of wear elements including first wear elements and second wear elements, placing the first wear elements in the first cavities and second wear elements in the second cavities, where, after the first wear elements are placed in the first cavities, each of the first wear elements extends from within a respective one of the first cavities past the first end surface and has a first wear surface disposed above the first end surface, and, after the second wear elements are placed in the second cavities, each of the second wear elements extends from within a respective one of the second cavities past the second end surface and has a second wear surface disposed above the second end surface. The method further includes securing each wear element of the plurality of the wear elements to the body using a detachable structure.

BRIEF DESCRIPTION OF THE DRAWINGS

Representative aspects of the present disclosure may be understood from the following detailed description when read in conjunction with the accompanying Figures. It is noted that, in accordance with standard practice in industry, various features may not be drawn to scale. For example, dimensions of various features may be arbitrarily increased or reduced for clarity of illustration or description. Corresponding numerals and symbols in different Figures generally refer to corresponding parts, unless otherwise indicated.

DETAILED DESCRIPTION OF ILLUSTRATIVE EMBODIMENTS

Representative embodiments are discussed in detail below. It should be appreciated, however, that concepts disclosed herein are merely illustrative and are not intended to limit the scope of the claims. Furthermore, various changes, substitutions, or alterations can be made herein without departing from the spirit and scope as defined by the appended claims.

Figure 1:
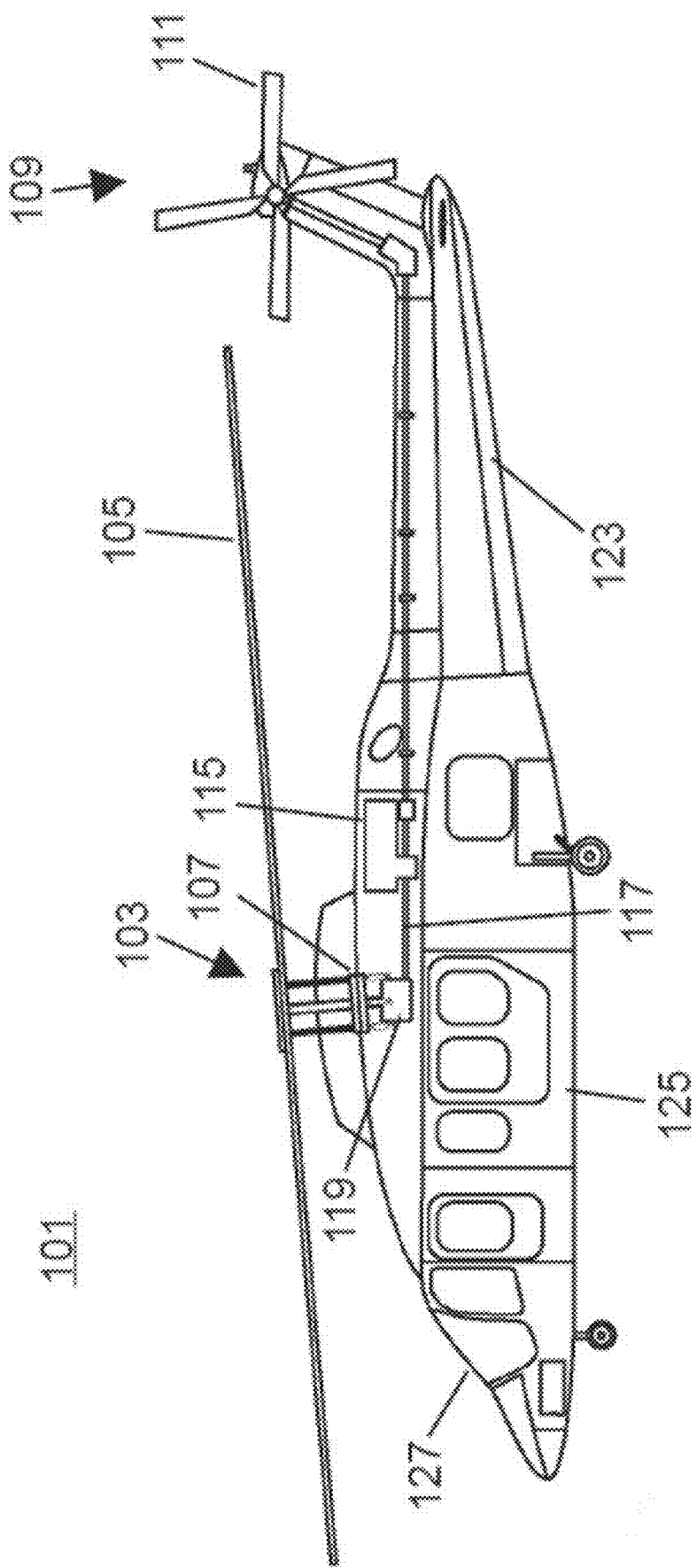
FIG. 1 illustrates a rotorcraft according to some embodiments.

FIG. 1 illustrates a rotorcraft 101 according to some embodiments. The rotorcraft 101 has a main rotor system 103, which includes a plurality of rotor blades 105. The pitch of each rotor blade 105 may be controlled by a swashplate 107 in order to selectively control the attitude, altitude and movement of the rotorcraft 101. The swashplate 107 may be used to collectively and/or cyclically change the pitch of the rotor blades 105. The rotorcraft 101 also has an anti-torque system, which may include a tail rotor 109, no-tail-rotor (NOTAR), or dual main rotor system. In rotorcraft with a tail rotor 109, the pitch of each tail rotor blade 111 is collectively changed in order to vary thrust of the anti-torque system, providing directional control of the rotorcraft 101.

Power is supplied to the main rotor system 103 and the anti-torque system by engines 115. There may be one or more engines 115. The output of the engine 115 is provided to a driveshaft 117, which is mechanically and operatively coupled to the main rotor system 103 and the anti-torque system through a main rotor transmission 119 and a tail rotor transmission 121, respectively.

The rotorcraft 101 further includes a fuselage 125 and tail section 123. The tail section 123 may have other flight control devices such as horizontal or vertical stabilizers, rudder, elevators, or other control or stabilizing surfaces that are used to control or stabilize flight of the rotorcraft 101. The fuselage includes a cockpit 127, which includes displays, controls, and instruments. It should be appreciated that even though rotorcraft 101 is depicted as having certain features, the rotorcraft may have a variety of implementation-specific configurations.

Collective pilot flight controls allow a pilot to control collective configurations, such as collective blade pitch, to rotor blades 105. Collective configurations of rotor blades 105 may change overall lift produced by rotor blades 105. For increasing or decreasing overall lift in rotor blades 105, the angle of attack for all rotor blades 105 may be collectively altered by equal amounts at the same time, resulting in ascent, descent, acceleration, or deceleration. Alteration of collective configuration of rotor blades 105 may be accomplished by input from a collective control assembly (not illustrated).

A rotor blade 105 that is moving in the same direction as the rotorcraft is called the advancing blade and the rotor blade 105 moving in the opposite direction is called the retreating blade. The amount of lift generated by an airfoil is proportional to the square of its airspeed. In a zero airspeed hover, the rotor blades 105, regardless of their position in rotation, have equal airspeeds and therefore equal lift. In forward flight, the advancing blade has a higher airspeed than the retreating blade, with the airspeed of the advancing rotor being the sum of the airspeed resulting from the rotation of the rotor and the forward airspeed of the rotorcraft. In contrast, a retreating blade has an overall airspeed that is the difference between the airspeed created by the rotation of the rotor minus the forward airspeed speed of the rotorcraft. This difference in the relative airspeeds of the advancing and treating rotor blades creates unequal lift across the rotor disc.

When dissymmetry of lift causes the retreating blade to experience less airflow than required to maintain lift, a condition called retreating blade stall can occur. This causes the helicopter to roll to the retreating side and pitch up due to gyroscopic precession. This situation, when not immediately recognized can cause a severe loss of aircraft controllability. Thus, balancing lift across the rotor disc is important to a helicopter's stability. Dissymmetry of lift is countered by cyclic inputs, with the cyclic inputs potentially causing blade flapping. Rotor blades are designed to flap by lifting and twisting in response to cyclic inputs, flight conditions, rotorcraft pitch and associated airspeed, and the like.

Embodiments of the disclosed rotor system, such as found on a helicopter or other rotorcraft, provide a flap stop apparatus to limit the amount of sag or vertical flap in the rotor blades under various conditions of operation. Flap stops may be included to limit both downward displacement, and upward displacement. Flap stops limiting downward displacement play a dual role of limiting downward rotor blade displacement during flight as well as limiting rotor blade drooping at low RPM or when stopped. The flap stop apparatus may be designed to place maximum restriction on rotor blade downward displacement at low RPM or while stopped to avoid sagging blades contacting the ground or portions of the aircraft such as the fuselage or tailboom.

The use of a droop ring and flap stop mechanism allows for greater displacement of rotor blades during flight and reduced displacement at low RPM operation or while stopped. During flight, displacement of rotor blade or blades will occur with cyclic periodicity such that flap stop bearing surfaces come into contact with droop ring bearing surface on only one side of the rotor system. The droop ring is deflected toward the rotor mast, permitting maximum deflection of the rotor blade. At low RPM, as the blades sag under the influence of gravity, the flap stop bearing surfaces on all rotor blades will come to rest on the droop ring bearing surface, resulting in minimum deflection of all rotor blades in the rotor system, as the droop ring is centered on the mast by equal pressure from opposing sides as a result of all rotor blades drooping simultaneously.

Since the droop ring floats around the mast, the droop ring tends to rub against retaining surfaces. Embodiments of the disclosed droop ring provide with removable and replaceable friction surface or wear surface inserts, which allow for removal of predefined parts that are designed for wear, and may be made of a friction resistant material that is different from the structural material of the droop ring that bears the pressure of the flap stops. This permits the friction surfaces to be replaceable and avoids a droop ring made from a solid material such as steel that may have wear surfaces lubricated with grease, or requiring wear reducing parts such as self-lubricating washers. Additionally, the use of a removable friction surface insert avoids wear on the contact surfaces where the droop ring comes into contact with the rotor shaft components and provides a lighter, cheaper part that must be replaced after wear limits are exceeded. The removable friction insert or wear element may also be made from a lighter, more economical material than the droop ring itself.

Representative embodiments of the disclosure may provide one or more technical advantages. A technical advantage of one embodiment may include a capability to provide longer service life of a rotor assembly due to reduced wear. Another technical advantage of an embodiment may include reduced weight of the rotor assembly. Yet another technical advantage of an embodiment may include improved maintainability of the rotor assembly and reduced cost of replacement parts.

Figure 2:
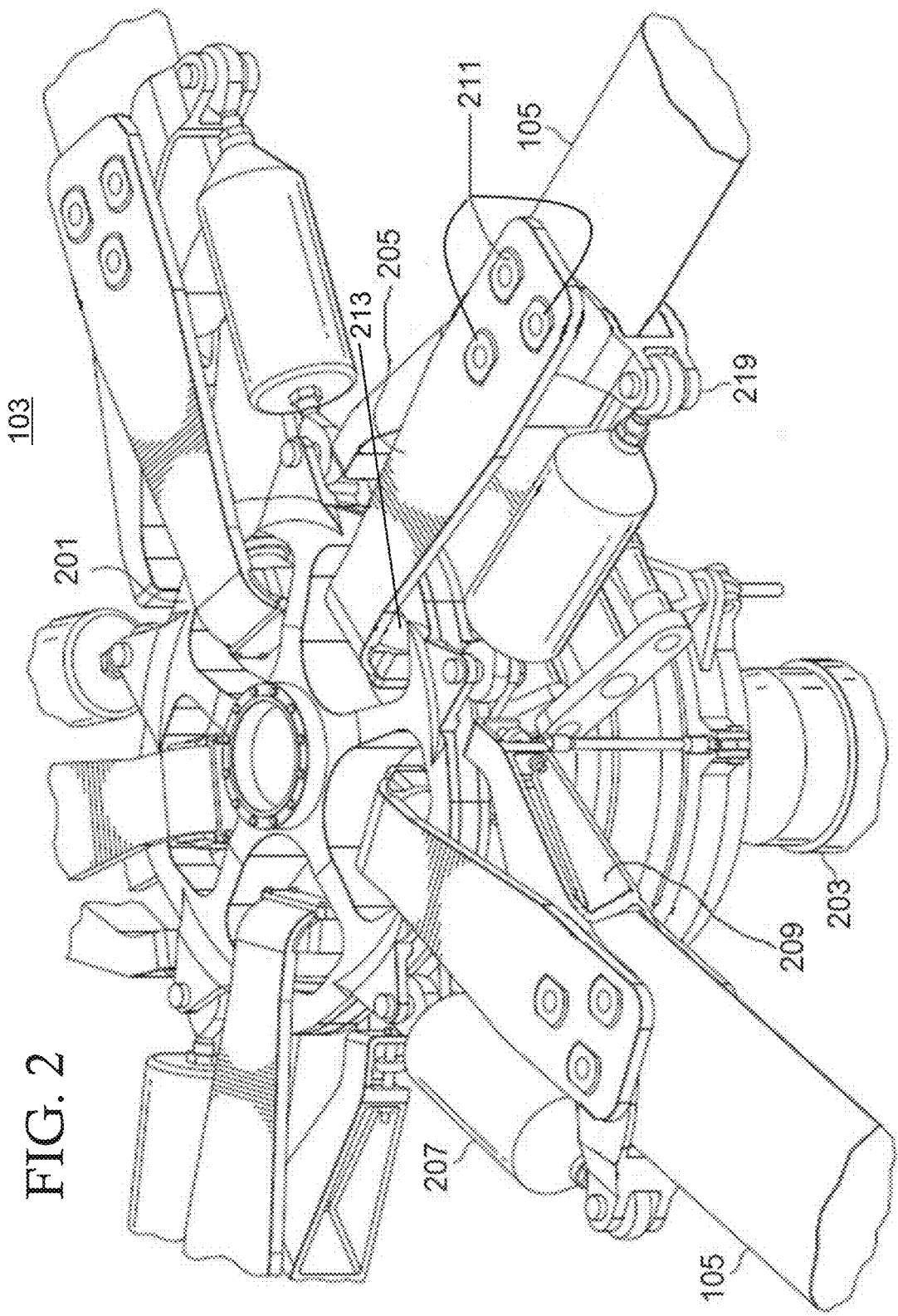
FIG. 2 illustrates a main rotor system according to some embodiments.

FIG. 2 illustrates a main rotor system 103 according to some embodiments. The main rotor system 103 includes a yoke 201 coupled to a mast 203. Each rotor blade 105 is coupled to a yoke 201 by a grip 205. An inboard portion of each grip 205 is secured within an opening of the yoke 201 by a centrifugal force (CF) bearing 213. In some embodiments, the CF bearing 213 hingedly attaches the grip 205 to the yoke, permitting the grip 205 and associated rotor blade 105 to flap with respect to the yoke 201. The grip 205 is a single substantially continuous member that may be formed from a single, contiguous laminate. A rotor blade 105 is attached to the outboard portion of grip 205 by fasteners 211. A pitch horn 209 is disposed inside the grip 205 and may space the rotor blade 105 apart from interior surfaces of the grip 205. A damper 207 is attached between yoke 201 and a damper attachment portion 219 of the pitch horn 209.

Figure 3:
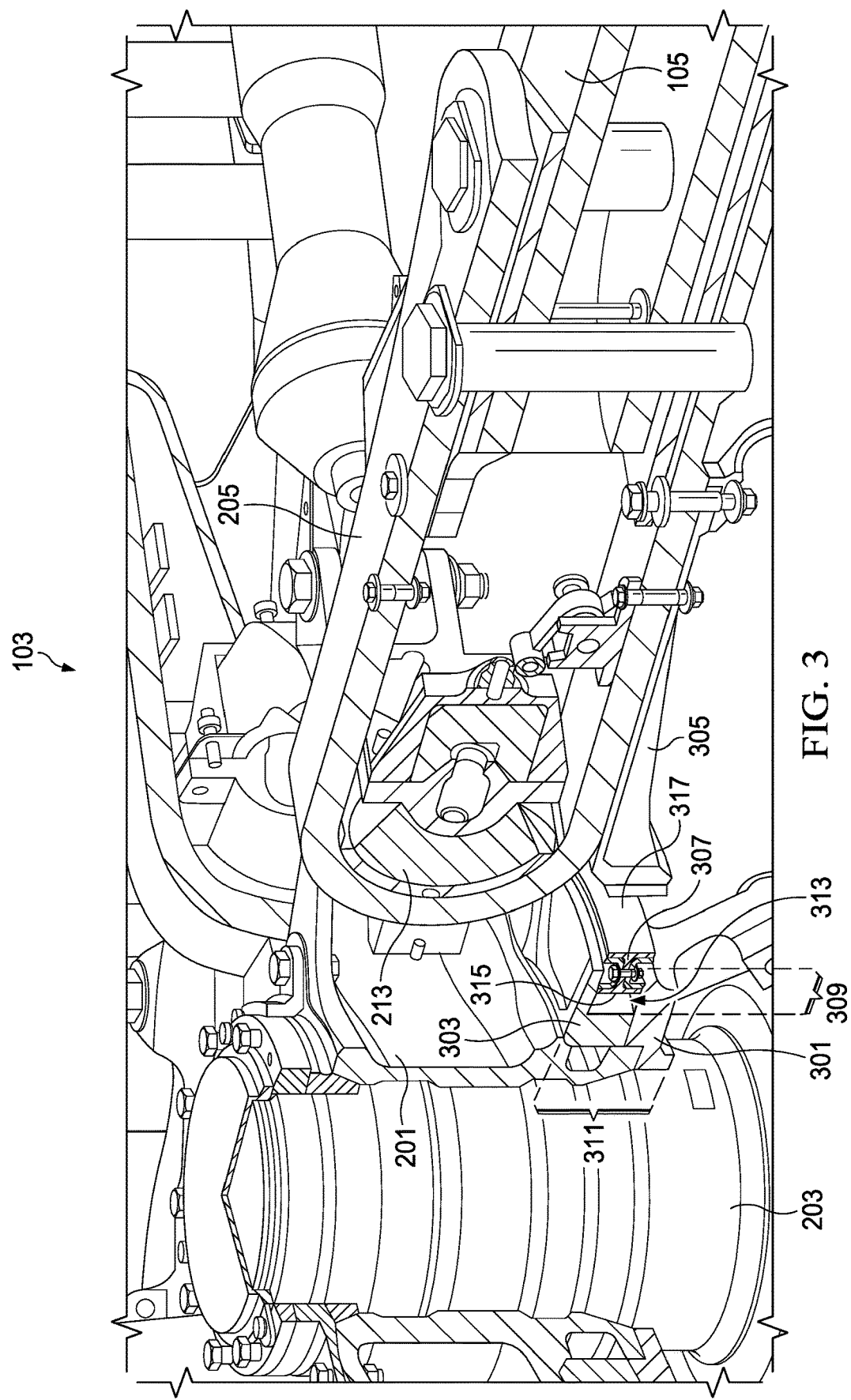
FIG. 3 is a cross-sectional view of a main rotor system having a droop limiting system according to some embodiments.

FIG. 3 is a cross-sectional view of a main rotor system 103 having a droop limiting system 311 according to some embodiments. The flapping of the rotor blades 105 is enabled by the CF bearing 213, which permits the rotor blade 105 to rotate or flap upward. However, when the main rotor system 103 is at rest, or at low speed, the centrifugal force caused by the main rotor system 103 turning, combined with a lack of lift from the rotor blades 105, fails to keep the rotor blades 105 raised to a normal flight angle, and the rotor blades 105 droop. A droop limiting system 311, in combination with a droop ring 307, prevents the rotor blades 105 from dropping too far when at rest, and may also prevent the rotor blades 105 from drooping too far during maneuvering. The droop limiting system 311 may, in some embodiments, retain a droop ring 307 that freely floats with respect to the mast 203, but that provides a physical stop to control the droop of the rotor blades 105. In some embodiments, the droop limiting system 311 may include a drive hub 301 and an upper droop ring retainer 303. The droop ring 307 is retained in the main rotor system 103 between upper and lower retaining surfaces that are provided, in some embodiments, by the drive hub 301 and the upper droop ring retainer 303. The drive hub 140 and upper droop ring retainer 141 are affixed to the yoke 201, and form a channel 309 in which the droop ring 307 is retained. The channel 309 may include a stop surface 313 that is an inner surface of the channel 309 nearest the mast 203 and that is disposed between the upper and lower retaining surfaces to form the channel 309.

In some embodiments, a flap stop 305 is attached to the grip 205. As the rotor blades 105 sag or droop at low RPM, or when stopped, the flap stop 305 contacts the outer surface 317 of the droop ring 307, preventing further sag of the grip 205 and attached rotor blade 105. In some embodiments, removable wear elements of the droop ring 307 contact the inner surface of the channel 309, so that, as the flap stop 305 shifts or moves the droop ring 307, the wear inserts in the droop ring 307 contact the drive hub 301 and upper droop ring retainer 303, avoiding wear on the structural body of the droop ring 307.

In some embodiments, the droop ring 307 is slideably disposed within the channel 309. The droop ring 307 has an inner surface 315 that is larger than, or has a radius larger than, the stop surface 313 of the channel 309, and so that all, or at least a portion, of the inner surface 315 of the droop ring 307 is spaced apart from the stop surface 313 of the channel 309. This permits the droop ring 307 to move laterally before the inner surface 315 contacts the stop surface 313 of the channel 309 so that, when rotor system 103 operates at low RPMs, or is stopped, and all rotor blades 105 sag, each of the flap stops 305 come into contact with droop ring 307 creating equal opposing forces on the droop ring 130. This results in the droop ring 307 being centered on the mast 203, with a substantially equal gap between the inner surface 315 of the droop ring 307 and around the stop surface 313 of the channel 309. For example, the droop ring 307 may be sized so that, at rest, the droop ring 307 is substantially centered when the flap stops of each rotor blade contact the droop ring 307 and limit the droop of the rotor blades to between about 1 degrees and about 4 degrees.

In some embodiments, when the main rotor system 103 operates at a relatively high flight RPM, for example, during flight maneuvering, the rotor disc may tilt with respect to the mast 203 due to, for example, cyclic control inputs. During this tilting, or flapping, the displacement of the individual rotor blades 105 occurs periodically during rotation of the rotor blades, with the rotor blades 105 flapping, or being tilted downward on one side of the mast 203. As each rotor blade 105 reaches the low point in the rotation, the flap stop 305 associated with the respective rotor blade 105 will contact the outer surface 317 of the droop ring 307, and cause the droop ring 307 to shift in relation to the mast. Thus, the droop ring 307 will be displaced towards the mast 203 on the side where the rotor blades 105 tilt downward, while the flap stops 305 on the opposing side are moved away from the mast 203 and the channel 309, permitting greater vertical displacement of the rotor blades 105 than allowed when all of the rotor blades 105 droop simultaneously. This is because, during low-speed droop, the flap stops 305 on opposite sides of the droop ring 307 tend to center the droop ring 307 in the channel 309 so that the inner surface 315 of the droop ring 307 is spaced substantially equally on all sides from the stop surface 313. In contrast, during high speed flapping, cyclic inputs cause one side of the main rotor system 103 to move lower than the opposing side, and the flap stops 305 of rotor blades 105 transiting the low side of the rotor disc are able to push the droop ring 307 on that side laterally since there is not an opposing force from the flap stops 305 on the opposite side of the droop ring 307. Thus, the droop ring 307 may be further sized so that, at higher RPM or a normal operating speed range, only some of the flap stops 305, for rotor blades 105 transiting the low side of the rotor disc, contact the outer surface 317 of the droop ring 307, and the droop ring 307 translates laterally in the channel 309. In some embodiments, one side of the inner surface 315 of the droop ring 307 contacts the stop surface 313, depending on the magnitude of the flapping. Thus, the droop ring 307 may limit the rotor blades 105 on the low side to a flapping angle between about 7 degrees and 11 degrees.

In some embodiments, the droop ring 307 is sized so that the permitted droop of each rotor blade 105 at rest is less than the droop permitted for a low rotor blade 105 at higher speed. For example, the droop ring 307 may be sized so that, at rest, the rotor blades 105 are limited to a an angle of about 2.5 degrees below a plane that is substantially orthogonal to the mast, and during operation, the rotor blades are limited to an angle of about 9 degrees below the plane substantially orthogonal to the mast.

Figure 4:
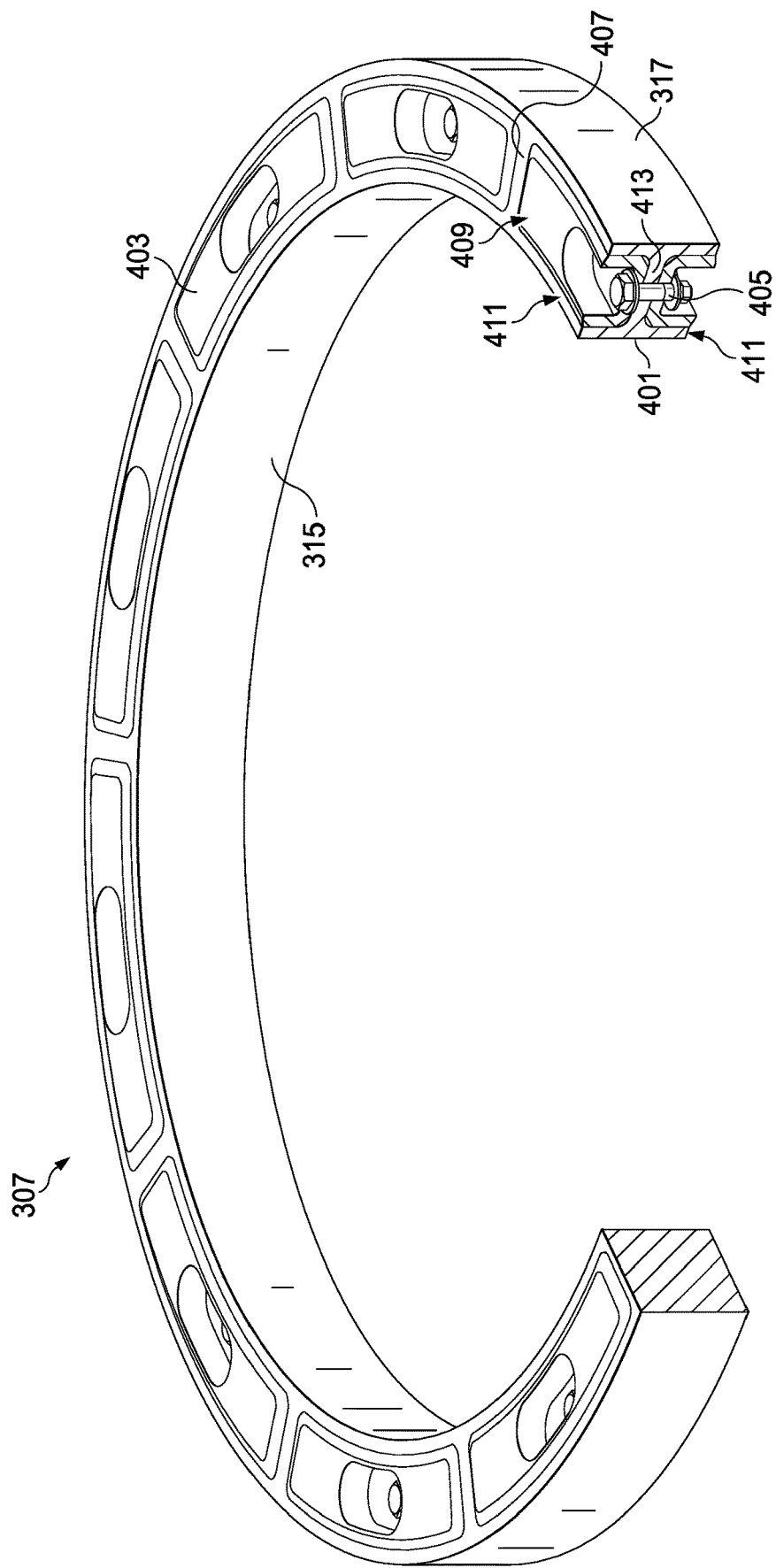
FIG. 4 is a cut-away view of a droop ring according to some embodiments.

FIG. 4 is a cut-away view of a droop ring 307 according to some embodiments. The droop ring 307 may have a body 401 that is formed from a structural material such as steel, titanium, aluminum, an alloy, a composite, or the like, that bears the weight of the rotor blades when the flap stops 305 contact the outer surface 317 of the droop ring 307. In some embodiments, the body 401 is a continuous ring free of breaks. The body 401 may have wear elements 403 disposed cavities 409 in the end surfaces 411 of the body, and the cavities 409 in a same end surface 411 may be separated by radial walls 407. Additionally, in some embodiments, body 401 has cavities 409 on opposing end surfaces 411 of the body 401 and that are separated by a center wall 413. One or more wear elements 403 may be disposed in the cavities 409. In some embodiments, the droop ring body 401 may have an I-beam shape, providing stiffness in the lateral direction of the droop ring 307 to resist the forces applied by the flap stops 305. In this embodiment, the wear elements 403 may be disposed in the cavities 409 created by the I-beam shape. In other embodiments, the droop ring body 401 may be a honeycomb shape with wear elements 403 in one or more openings, may have round holes with round wear elements 403, or may have another shape that holds the wear elements 403.

In some embodiments, the wear elements 403 are formed from a polymer such as, for example, polyether ether ketone (PEEK), polyetherketoneetherketoneketone (PEKEKK), polytetrafluoroethylene (PTFE), polyimide (PI), polyamide-imide (PAI), or another low friction polymer. In other embodiments, the wear elements 403 are formed from a metal or alloy such as bronze, aluminum alloys, or the like. In some embodiments, a single wear element 403 is disposed within each cavity 409, and wear elements 403 of a wear element pair are disposed on opposing sides of the droop ring 307. The droop ring may 307 have also have wear elements 403 arranged so that corresponding wear elements 403 are disposed at opposing end surfaces 411 in a substantially mirror image arrangement. In other embodiments, the wear elements 403 may be disposed on top of the end surfaces 411 of the droop ring 307, multiple wear elements 403 may be disposed in each cavity 409, or one or more wear elements 403 may extend into multiple cavities 409. In some embodiments, the wear elements 403 extend past or above the end surface 411 of the droop ring 307 so that the wear elements 403 contact the retaining surfaces of the droop limiting system and space the droop ring 307 body 401 apart from the droop limiting system surfaces. Thus, the wear elements 403 bear the movement of the droop ring 307 without the body 401 contacting the droop limiting system surfaces, and avoid wear on the structural portions of the droop ring 307.

The wear elements 403 may be disposed in the cavities 409, and may be retained by a fastener 405. The wear elements 403 are removable and replaceable, so that the wear surfaces of the droop ring 307 may be rebuilt or refurbished by replacing the wear elements 403. In some embodiments, the removable wear elements 403 permit the body 401 of the droop ring 307 to be reused, while the wear elements 403 are replaceable. Therefore, in some embodiments, the droop ring 307 to be made lighter than a solid steel structure, while still retaining the reusability and reparability of the droop ring 307.

Figure 5:
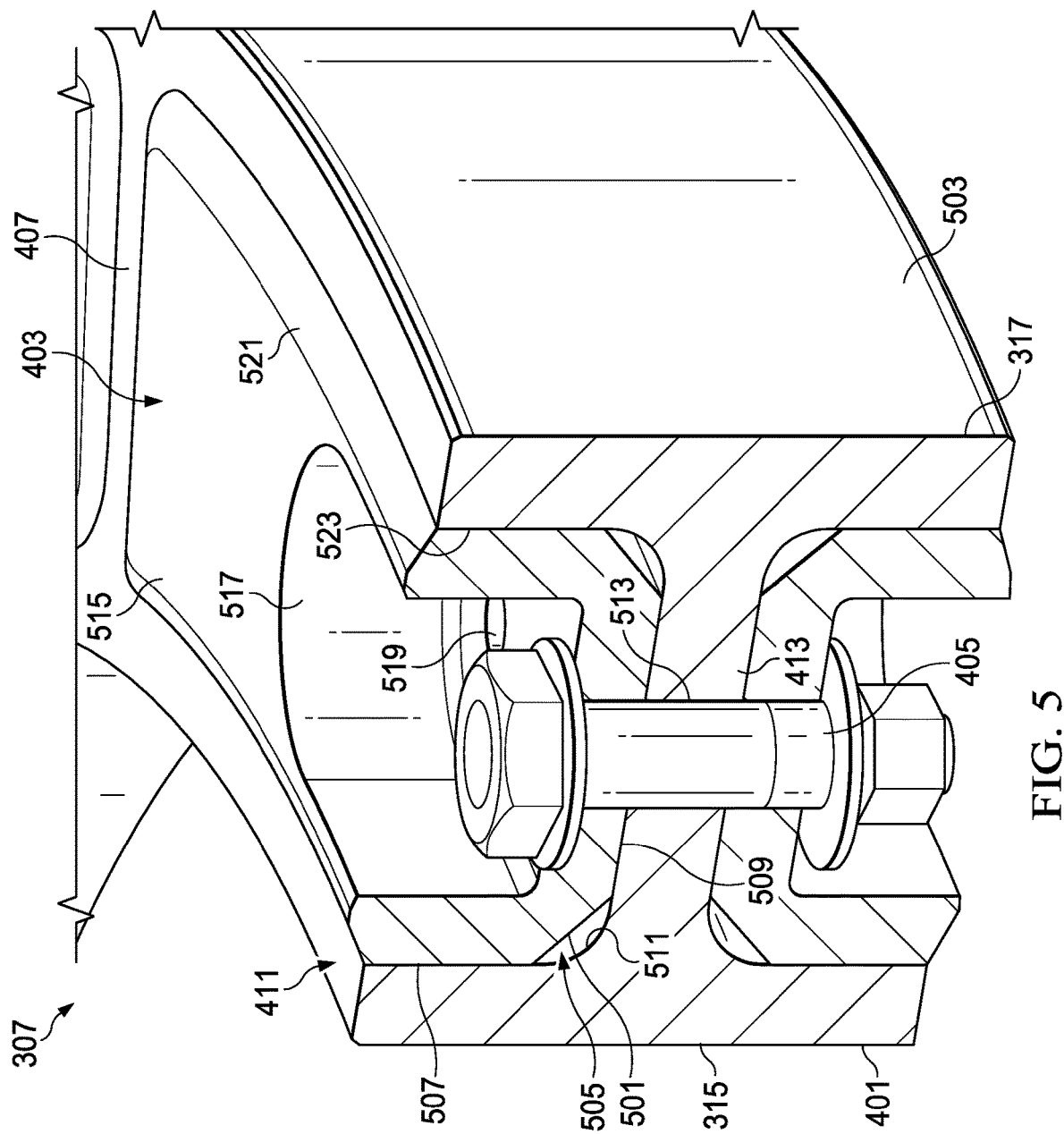
FIG. 5 is a cross-sectional view illustrating a droop ring according to some embodiments.

FIG. 5 is a cross-sectional view illustrating a droop ring 307 according to some embodiments. The body 401 of the droop ring has cavities 409 disposed in the end surfaces 411, and wear elements 403 are disposed in the cavities 409. In some embodiments, the cavities 409 and wear elements 403 are spaced apart from the inner surface 315 and outer surface 317 of the droop ring 307 body 401, so that portions of the end surfaces 411 are exposed. A top surface 515 of the wear element 403 extends above the end surface 411 of the body 401. In some embodiments, the wear elements 403 have a chamfer 521 in a top, outer edge to prevent the wear elements 403 from tearing, chipping or hanging on imperfections in surfaces of the droop limiting system as the droop ring 307 moves within the channel of the droop limiting system.

In some embodiments, the wear element 403 has sides 507 that are in contact with the sidewalls 523 of the cavities 409. The wear elements 403 may further have a bottom 509 that is in contact with a bottom surface 525 of the cavity 409. In some embodiments, each cavity 409 may have a fillet 511 connecting the bottom surface 525 to the sidewalls 523 of the cavity 409. The wear element 403 may have a relief surface 501 or chamfer in a bottom edge between the bottom 509 and the sides 507 of the wear element 403. When the wear element 403 is disposed in the cavity 409, the relief surface 501 may be spaced apart from the fillet 511 by a relief space 505 that allows the wear element 403 to fit into the cavity without requiring that the bottom edges of the wear element 403 conform to the fillet 511. Additionally, in some embodiments, the relief space 505 may provide space for the wear element 403 to compress slightly then force is applied to the droop ring 307.

In some embodiments, each wear element 403 has a recess 517 disposed in the top surface 515. The recess 517 is spaced apart from the sides 507 and the chamfer 521, where included, and the recess 517 extends from the top surface 515 toward the bottom 509 of the wear element 403. The wear element 403 is retained in the cavity 409 by a fastener 405, which in some embodiments, may be a nut and bolt assembly. In other embodiments, the fastener 405 may be multiple bolts, one or more screws, pins, clips or other fastener that permits the wear element 403 to be removed for replacement. In some embodiments, the fastener 405 extends through a fastener opening 513 in the center wall 413, and may, in some embodiments, retain multiple wear elements 403. For example, the body 401 may have corresponding cavities 409 in opposing end surfaces 411, and a fastener 405 may be disposed in a recess 517 of the wear element 403 and extend through the first wear element 403, through the fastener opening 513 in the center wall 413, and through the second wear element 403 into the recess 517 of the second wear element 403. The fastener 405 may have end surfaces that are disposed in respective recesses 517 of the wear elements 403, with the fastener 405 end surfaces below the top surfaces 515 of the wear elements 403 to prevent the fastener 405 from contacting the surfaces in the channel of the droop limiting system. In some embodiments, the droop ring 307 may further have one or more drain holes 519. A drain hole 519 may be disposed in a recess 517 of a first wear element 403, and may extend through the first wear element 403, through the center wall 413 and through a second wear element 403 opposite the first wear element 403. The drain hole 519 may permit water or debris that enters the recess 517 to flow out, preventing the wear element 403 from retaining foreign matter.

In some embodiments, the body 401 may have one or more protective layers 503. In some embodiments, the protective layer 503 is provided on the outer surface 317 and/or the inner surface 315 of the droop ring 307. The protective layer 503 may be a hardened material or layer that protects the body 401 from contact with the stop surface of the channel, or with the flap stops 305. In some embodiments, the protective layer 503 protects against substantially stationary contact, as the droop ring 307 generally rotates with the blades, the rotor system and the droop limiting system, and the inner surface 315 and outer surface 317 have substantially stationary contact with the stop surface or flap stops 305. In some embodiments, the protective layer 503 is a coating such as tungsten carbide (WC or $W_2C$), titanium carbide (TiC), titanium nitride (TiN), tantalum carbide (TaC), cobalt (Co) alloys, ceramic-metal composites (cermets), a polymer, or the like. In some embodiments, such as for example, a WC protective layer 503, the protective layer 503 may be applied using a flame spray or thermal spray process, where the metal compound is injected into a flame jet. The metal compound melts in the flame jet and is accelerated toward the target surface, where it solidifies and remains to form a durable coating.

Figure 6:
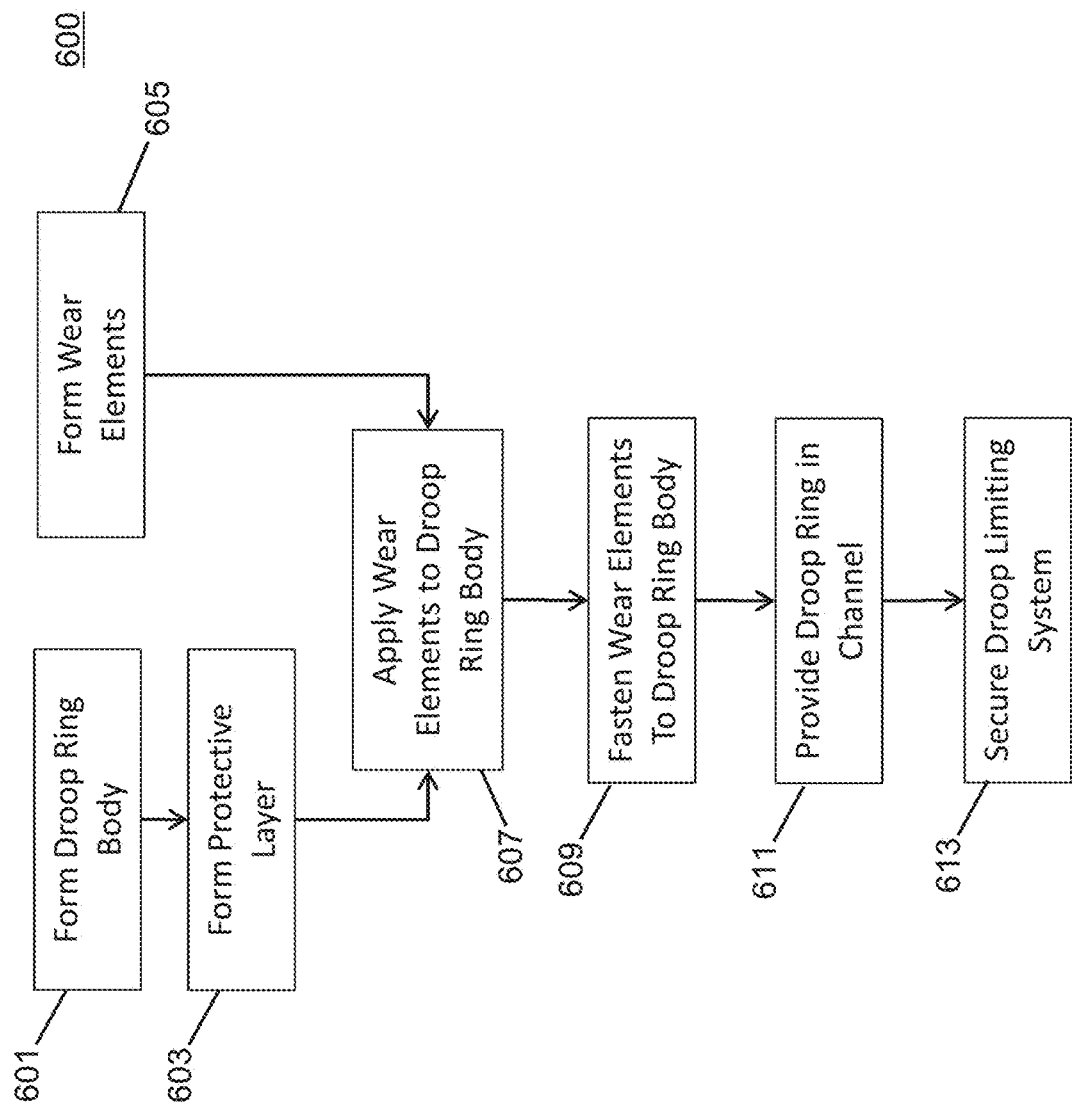
FIG. 6 is a flow diagram illustrating a method for forming a droop ring according to some embodiments.

FIG. 6 is a flow diagram illustrating a method 600 for forming a droop ring according to some embodiments. The body of the droop ring is formed in block 601. In some embodiments, the droop ring may be machined from a block. In other embodiments, the body is press formed, molded using a powered metal and sintering process, or the like. The circular shape of the body may be formed and the cavities, drain holes, fastener openings and the like may be drilled, machined, cut or otherwise formed after the body is shaped. In block 603, the protective layer is applied to the body of the wear element. In some embodiments, the protective layer may be applied to the outer surface of the body, and in other embodiments, the protective layer may also be applied to the inside surface, end surfaces or cavities of the body. In some embodiments, the protective layer is tungsten carbide applied by a flame spray or thermal spray application process.

In block 605, the wear elements are formed. The wear elements may be molded using, for example, an injection molding process or other molding process, by machining the wear elements from a larger blank, or the like. The body of the wear elements may be formed with features such as the recesses, chamfers, relief surfaces, fastener openings and drain holes, or the features may be formed after the body of the wear element is formed.

In block 607, the wear elements are applied to the droop ring body. In some embodiments, the wear elements are formed separately from the droop ring and attached to the droop ring body after formation. The wear elements may be inserted into the cavities in the droop ring body, or may be otherwise applied or attached to a surface of the droop ring body. In other embodiments, the wear elements may be formed in place in the droop ring, or partially formed independently of the droop ring body, inserted into cavities in the droop ring body, and machined while in the droop ring. For example, the outer surfaces and recess of the droop ring may be molded into the body of the droop ring, and the wear elements may be inserted into cavities in the droop ring body, and fastener holes and drain holes may be machined or drilled through the wear elements and droop ring body to ensure that the fastener holes and drain holes of the wear elements align with the fastener holes and drain holes of the droop ring body.

In block 609, the wear elements are fastened to the droop ring body. The wear elements are fastened to the droop ring body in a removable or detachable manner, so that the wear elements can later be removed from the droop ring body. In some embodiments, a fastener is a detachable structure and may be a structure such as a bolt, screw, pin, or the like, may be inserted into the fastener hole and may extend through the wear elements and the droop ring body to retain the wear elements in the cavities. In other embodiments, the fastener may be a detachable structure such as a clip, or other retaining structure, or may be an adhesive, tape, or the like.

After the wear elements are fastened to the droop ring body, the droop ring may be installed in a rotor system. In block 611, the droop ring is provided in the channel, and in block 613, the droop limiting system is secured to retain the droop ring in the channel.

An embodiment rotorcraft has a rotor system and includes a yoke, a plurality of grip assemblies, each grip assembly of the plurality of grip assemblies hingedly attaching a respective rotor blade of a plurality of rotor blades to the yoke, a plurality of flap stops, each flap stop of the plurality of flap stops attached to a respective grip assembly of the plurality of grip assemblies, a droop limiting system having a channel bounded by an upper retaining surface, a lower retaining surface and a stop surface disposed between the upper retaining surface and the lower retaining surface, and a droop ring slideably disposed in the channel of the droop limiting system, the droop ring having a body with an inner surface, an outer surface, and a first end surface disposed between the inner surface and the outer surface, the droop ring further having a first wear element disposed at the first end surface, wherein the first wear element is removable, and wherein the first wear element extends above the first end surface and spaces the first end surface apart from the channel. Each flap stop of the plurality of flap stops is arranged to contact the outer surface of the droop ring and limit a downward droop of the respective rotor blade.

In some embodiments, the first end surface has a first cavity, and the first wear element is disposed in the first cavity. In some embodiments, the body further has a second end surface opposite the first end surface and further has a second cavity with a second wear element disposed in the second cavity, and the second wear element spaces the second end surface apart from the channel. In some embodiments, the first cavity is separated from the second cavity by a center wall. In some embodiments, the first wear element has a first recess and the second wear element has a second recess, and a fastener extends from the first recess, through a through a portion of the first wear element, through the center wall, through a portion of the second wear element, into the second cavity. In some embodiments, an upper surface of the first wear element is disposed above the first end surface, and a first edge of the first wear element bordering the upper surface of the wear element has a chamfer. In some embodiments, the first cavity has a fillet joining side surfaces of the first cavity to a bottom surface of the first cavity, where the upper surface of the first wear element is disposed above the first end surface, and the first wear element has a relief surface in a bottom edge between a bottom surface of the first wear element and sides of the first wear element, where the relief surface is spaced apart from the fillet by a relief space.

An embodiment droop ring includes a body having an inner surface, an outer surface, a first end surface disposed between the inner surface and the outer surface, and a second end surface disposed between the inner surface and the outer surface opposite the first end surface, where the first end surface has first cavities and the second surface has second cavities. The droop ring further includes a plurality of wear elements comprising first wear elements removably disposed in the first cavities and second wear elements removably disposed in the second cavities, where each of the first wear elements extends from within a respective one of the first cavities past the first end surface and has a first wear surface disposed above the first end surface, and where each of the second wear elements extends from within a respective one of the second cavities past the second end surface and has a second wear surface disposed above the second end surface.

In some embodiments, the body further has center walls, and each of the first cavities is separated from a respective one of the second cavities by a respective one of the center walls. In some embodiments, the droop ring further includes fasteners securing the first wear elements in the first cavities and the second wear elements in the second cavities. In some embodiments, each of the fasteners extends from one of the first wear elements, through one of the center walls, into one of the second wear elements. In some embodiments, a first end of each of the fasteners extends into a first recess in the first wear surface of a respective one of the first wear elements, and a second end of each of the fasteners extends into a second recess in the second wear surface of a respective one of the second wear elements. In some embodiments, a protective layer is disposed on the outer surface of the body and comprising a first metal, wherein the body is formed form a second metal different from the first metal. In some embodiments, the protective layer is tungsten carbide, the body is steel, and each wear element of the plurality of the wear elements is formed from a polymer. In some embodiments, each of the first wear elements has a chamfer at a first edge that borders the respective first wear surface of the respective one of the first wear elements, and each of the second wear elements has a chamfer at a second edge that borders the respective second wear surface of the respective one of the second wear elements. In some embodiments, each of the first cavities has a fillet joining side surfaces of the respective one of the first cavities to a bottom surface of the respective one of the first cavities, and each of the first wear elements has a relief surface in a bottom edge between a bottom surface of the respective one of the first wear elements and sides of the respective one of the first wear elements, where the relief surface is spaced apart from the fillet by a relief space.

An embodiment method of forming a rotorcraft droop ring, includes forming a body having ring shape with an inner surface, an outer surface, a first end surface disposed between the inner surface and the outer surface, and a second end surface disposed between the inner surface and the outer surface opposite the first end surface, where the first end surface has first cavities and the second surface has second cavities, providing a plurality of wear elements including first wear elements and second wear elements, placing the first wear elements in the first cavities and second wear elements in the second cavities, where, after the first wear elements are placed in the first cavities, each of the first wear elements extends from within a respective one of the first cavities past the first end surface and has a first wear surface disposed above the first end surface, and, after the second wear elements are placed in the second cavities, each of the second wear elements extends from within a respective one of the second cavities past the second end surface and has a second wear surface disposed above the second end surface. The method further includes securing each wear element of the plurality of the wear elements to the body using a detachable structure.

In some embodiments, the securing each wear element includes providing fasteners such that each of the fasteners extends from one of the first wear elements, through a portion of the body, into one of the second wear elements. In some embodiments, the forming the body includes providing a protective layer on the outer surface of the body, the protective layer including a first metal, where the body is formed from a second metal different from the first metal. In some embodiments, the method further includes placing the droop ring in a channel of a droop limiting system of a rotor system and securing the droop limiting system and retaining the droop ring in the channel.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A rotorcraft having a rotor system, comprising:
a yoke;
a plurality of grip assemblies, each grip assembly of the plurality of grip assemblies hingedly attaching a respective rotor blade of a plurality of rotor blades to the yoke;
a plurality of flap stops, each flap stop of the plurality of flap stops attached to a respective grip assembly of the plurality of grip assemblies;
a droop limiting system having a channel bounded by an upper retaining surface, a lower retaining surface and a stop surface disposed between the upper retaining surface and the lower retaining surface; and
a droop ring slideably disposed in the channel of the droop limiting system, the droop ring having a body with an inner surface, an outer surface, and a first end surface disposed between the inner surface and the outer surface, the droop ring further having a first wear element disposed at the first end surface, wherein the first wear element is removable, and wherein the first wear element extends above the first end surface and spaces the first end surface apart from the channel;
wherein each flap stop of the plurality of flap stops is arranged to contact the outer surface of the droop ring and limit a downward droop of the respective rotor blade;
wherein the body has a ring shape with the outer surface forming an outer edge of the body and extending contiguously in a circle around the entirety of the body, wherein the body has a protective layer disposed on the outer surface of the body, wherein the protective layer is formed from a material different than a material forming the body, and wherein the protective layer extends contiguously in a circle around the entirety of the body; and
wherein a plurality of drain holes are disposed in the droop ring, where each drain hole of the plurality of drain holes extends contiguously from a first recess of the first wear element, through the first wear element, through a center wall of the body, through a second wear element opposite the first wear element, and to a second recess of the second wear element.

2. The rotorcraft of claim 1, wherein the first end surface has a first cavity, and wherein the first wear element is disposed in the first cavity.

3. The rotorcraft of claim 2, wherein the body further has a second end surface opposite the first end surface and further has a second cavity with the second wear element disposed in the second cavity, wherein the second wear element spaces the second end surface apart from the channel.

4. The rotorcraft of claim 3, wherein the first cavity is separated from the second cavity by a center wall.

5. The rotorcraft of claim 4, the first wear element has a first recess and the second wear element has a second recess, and wherein a fastener extends from the first recess, through a portion of the first wear element, through the center wall, through a portion of the second wear element, into the second cavity.

6. The rotorcraft of claim 2, wherein an upper surface of the first wear element is disposed above the first end surface, and wherein a first edge of the first wear element bordering the upper surface of the wear element has a chamfer.

7. The rotorcraft of claim 6, wherein the first cavity has a fillet joining side surfaces of the first cavity to a bottom surface of the first cavity, and wherein the upper surface of the first wear element is disposed above the first end surface, and wherein the first wear element has a relief surface in a bottom edge between a bottom surface of the first wear element and sides of the first wear element, wherein the relief surface is spaced apart from the fillet by a relief space.

8. A droop ring, comprising:
a body having an inner surface, an outer surface, a first end surface disposed between the inner surface and the outer surface, and a second end surface disposed between the inner surface and the outer surface opposite the first end surface, wherein the first end surface has first cavities and the second end surface has second cavities; and
a plurality of wear elements comprising first wear elements removably disposed in the first cavities and second wear elements removably disposed in the second cavities, wherein each of the first wear elements extends from within a respective one of the first cavities past the first end surface and has a first wear surface disposed above the first end surface, and wherein each of the second wear elements extends from within a respective one of the second cavities past the second end surface and has a second wear surface disposed above the second end surface;

wherein the body has a ring shape with the outer surface forming an outer edge of the body and extending contiguously in a circle around the entirety of the body, wherein the body has a protective layer disposed on the outer surface of the body, wherein the protective layer is formed from a material different than a material forming the body, and wherein the protective layer extends contiguously in a circle around the entirety of the body; and wherein a plurality of drain holes are disposed in the droop ring, where each drain hole of the plurality of drain holes extends contiguously from a first recess of a first respective wear element of the plurality of wear elements, through the first respective wear element, through a center wall of the body, through a second respective wear element of the plurality of wear elements, and to a second recess of the second respective wear element.

9. The droop ring of claim 8, wherein the body further has center walls, and wherein each of the first cavities is separated from a respective one of the second cavities by a respective one of the center walls.

10. The droop ring of claim 9, wherein the droop ring further comprises fasteners securing the first wear elements in the first cavities and the second wear elements in the second cavities.

11. The droop ring of claim 10, wherein each of the fasteners extends from one of the first wear elements, through one of the center walls, into one of the second wear elements.

12. The droop ring of claim 11, wherein a first end of each of the fasteners extends into a first recess in the first wear surface of a respective one of the first wear elements, and wherein a second end of each of the fasteners extends into a second recess in the second wear surface of a respective one of the second wear elements.

13. The droop ring of claim 8, wherein the protective layer comprises a first metal, and wherein the body is formed from a second metal different from the first metal.

14. The droop ring of claim 8, wherein each of the first wear elements has a chamfer at a first edge that borders the respective first wear surface of the respective one of the first wear elements and that extends from an outer surface of the respective first wear element and from at least the first end surface, to above the first end surface, and to a first top surface of the respective first wear element, and wherein each of the second wear elements has a chamfer at a second edge that borders the respective second wear surface of the respective one of the second wear elements and that extends from an outer surface of the respective second wear element and from at least the second end surface, to above the second end surface, and to a second top surface of the respective second wear element.

15. The droop ring of claim 8, wherein the each of the first cavities has a fillet joining side surfaces of the respective one of the first cavities to a bottom surface of the respective one of the first cavities, and wherein each of the first wear elements has a relief surface in a bottom edge between a bottom surface of the respective one of the first wear elements and sides of the respective one of the first wear elements, wherein the relief surface is spaced apart from the fillet by a relief space.

* * * * *